W. D. SMITH.
NUT LOCK.
APPLICATION FILED MAY 9, 1911.

1,003,379.

Patented Sept. 12, 1911.

Witnesses
J. H. Crawford.

Inventor
William D. Smith,
By Victor J. Evans
Attorney

UNITED STATES PATENT OFFICE.

WILLIAM D. SMITH, OF HERBST, INDIANA.

NUT-LOCK.

1,003,379.   Specification of Letters Patent.   Patented Sept. 12, 1911.

Application filed May 9, 1911. Serial No. 626,061.

*To all whom it may concern:*

Be it known that I, WILLIAM D. SMITH, a citizen of the United States, residing at Herbst, in the county of Grant and State of Indiana, have invented new and useful Improvements in Nut-Locks, of which the following is a specification.

The invention relates to nut locks, and has for its primary object to provide a nut lock in which there is arranged a pair of nuts, one of which is adapted to act upon a wedging dog carried by the other nut, so that the said dog will bite into the threads of the bolt, and thereby prevent the possibility of the loosening of the nut on the same, thus securely fastening the work engaged thereby.

Another object of the invention is the provision of a nut lock in which the main nut will be held fast on the bolt, so as to prevent the possibility of loosening thereof when clamping a piece of work, thereby obviating the possibility of the nut working off the bolt, resultant from vibrations transmitted thereto, thus obviating the necessity of constant attention to the main nut to determine whether or not the same is tight upon the bolt.

A further object of the invention is the provision of a nut lock which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
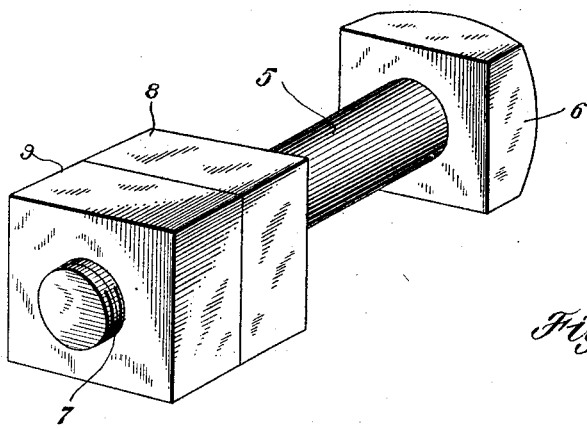
Figure 2:
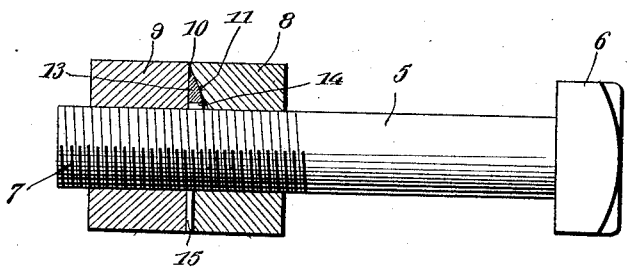
Figure 3:
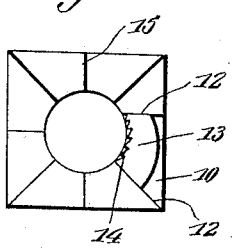
Figure 5:
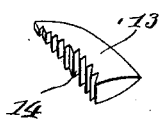
Figure 4:
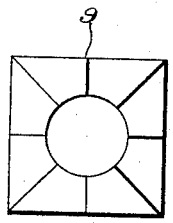

In the drawings: Figure 1 is a perspective view of a nut lock constructed in accordance with the invention. Fig. 2 is a vertical longitudinal sectional view therethrough. Fig. 3 is a plan view, looking toward the recessed face of the main nut. Fig. 4 is a plan view, looking toward the inner face of the jam nut. Fig. 5 is a perspective view of the locking dog.

Similar reference characters indicate corresponding parts throughout the several views of the drawings.

Referring to the drawings by numerals, 5 designates a bolt, which is of the ordinary well-known construction, having the usual head 6, the bolt, at its free end, being threaded, as at 7, for engagement with nuts, as usual.

The lock nut comprises a main or inner nut 8 and an outer auxiliary or jam nut 9, the main nut 8 being provided in its outer face with a recess 10 opening into the center aperture thereof, the recess being formed with an inwardly beveled bed or bottom 11, and opposite outwardly diverging side walls 12. Loosely fitted within the recess 10 is a wedge-shaped locking dog 13, the same being outwardly bowed or arcuately curved, and is formed at its inner edge with a plurality of teeth 14 to bite into the thread 7 upon the bolt 5, when the auxiliary or jam nut 9 contacts therewith on the turning of said auxiliary or jam nut upon the bolt 5, toward the main nut, thus securely locking the said main nut against loosening movement, thereby preventing it from working off the bolt, when the latter is clamping a piece of work.

The inner or adjacent faces of the main and auxiliary nuts 8 and 9 are formed with clutch teeth 15, which are adapted to interlock with each other, when the nuts are brought together, thereby preventing the working loose of the auxiliary or jam nut 9 when worked home against the main nut.

It will be noted that when the jam nut is worked home toward the main nut, it will force the dog 13 inwardly in the recss 10, so that the teeth 15 will bite into the thread 7 on the bolt for the secure locking of the main nut thereon. By reason of the wedge-shape of the locking dog 13, it will be caused to wedge into the recess between the nuts, when the same are jammed upon the bolt, thereby securely holding the main nut locked thereon, and also by reason of the interlocking engagement of the clutch teeth, the auxiliary or jam nut will be held fast upon the bolt as well.

What is claimed is:

The combination with a bolt, of inner and outer nuts threaded thereon, the inner nut being provided with an inwardly beveled recess in its outer face, a wedge-shaped locking dog loosely held within the recess and acted upon by the outer nut for the locking engagement of the dog with the bolt, and clutch teeth formed on adjacent faces of the inner and outer nuts and adapted for locking engagement with each other for holding the nuts locked together.

In testimony whereof I affix my signature in presence of two witnesses.

WILLIAM D. SMITH.

Witnesses:
MAY SMITH,
THOMAS L. MILLER.

Copies of this patent may be obtained for five cents each, by addressing the "Commissioner of Patents, Washington, D. C."